United States Patent Office 3,275,478
Patented Sept. 27, 1966

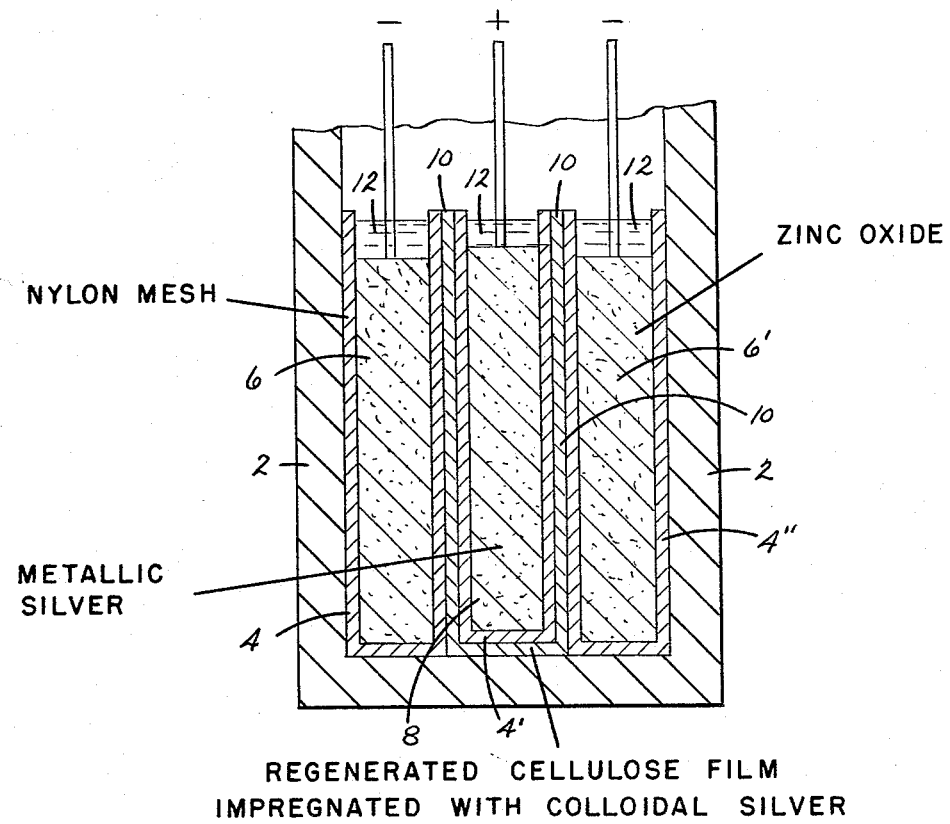

3,275,478
METHOD OF MAKING A BATTERY SEPARATOR CONTAINING COLLOIDAL METAL
Charles M. Rosser, Wallingford, and Richard A. Glinski, Clifton Heights, Pa., assignors to FMC Corporation, Philadelphia, Pa., a corporation of Delaware
Original application Feb. 21, 1963, Ser. No. 261,940. Divided and this application Mar. 18, 1965, Ser. No. 440,837
6 Claims. (Cl. 136—148)

This is a divisional application of Serial No. 261,940, filed Feb. 21, 1963.

This invention relates to an electro-chemical generator. More particularly, it relates to an electro-chemical generator or battery containing semi-permeable cellulosic membranes impregnated with colloidal silver or gold as the electrode separators.

It is known to use semi-permeable cellulosic membranes to separate battery electrodes in electro-chemical generators. These membranes permit the transfer of electrolyte ions but prevent the migration of larger metallic particles from one electrode to the other. These cellulose membranes are subject to oxidative deterioration caused by prolonged contact with strong acid or alkaline electrolyte solutions. Various processes and pretreatments have been used to improve the oxidation resistance of the cellulose membranes. However, many of these are comparatively expensive and not easily adapted to manufacture on a continuous basis.

It is an object of this invention to provide an electro-chemical generator having an increased number of charging cycles.

It is still another object of this invention to provide an electro-chemical generator including a highly oxidation-resistant cellulosic separator.

These and other objects are accomplished in accordance with this invention which comprises an electro-chemical generator having a positive electrode, a negative electrode, electrolyte, and semipermeable cellulosic membranes impregnated with colloidal metal selected from the group consisting of silver and gold.

Cellulosic membranes of this invention include regenerated cellulose and hydroxyalkyl cellulose ethers preferably having alkyl groups with from 2 to 4 carbon atoms. The regenerated cellulose mebranes include those prepared by the viscose process or by the cuprammonium process, and by de-esterification of cellulose esters including, for example, denitrated cellulose nitrate and de-acetylated cellulose acetate. The regenerated cellulose films or membranes, particularly de-esterified cellulose esters, are the preferred cellulosic membranes and will be used hereinafter to describe the invention.

While varying amounts of the colloidal metal may be deposited on and in the regenerated cellulose membrane, in general, the membrane is impregnated with from about 0.5 to about 5% of the colloidal metal based on the weight of the cellulose. Heavier amounts of the metal do not serve to appreciably increase the oxidation resistance of the cellulose membrane and may undesirably increase the internal resistance of the electrochemical generator. Preferably the regenerated cellulose membrane is impregnated with from about 1 to 2% of the colloidal metal based on the weight of the cellulose.

Conventionally regenerated cellulose films or membranes have dry thicknesses ranging from about 0.5 to about 5 mils, depending to a great degree on the method of manufacture. These sheets may be readily impregnated with the colloidal metal by immersing them in dilute aqueous solutions of water-soluble salts of either silver or gold for a short time i.e., at least about 0.1 minute, then placing the sheets in a dilute alkaline bath after first removing excess salt solution from the sheet. After a short period in the alkaline bath, e.g. from between 5 and 10 minutes, with accompanying exposure to actinic rays, which are normally present in a sun lighted room, the sheets are removed, washed with water, and permitted to dry. Under an electron microscope it can be seen that colloidal metal particles have impregnated the pores of the regenerated cellulose sheet in a substantially uniform manner.

Water-soluble silver and gold salts include, for example, silver nitrate, silver acetate, and auric chloride. The alkaline bath is preferably an aqueous solution of an alkali or alkaline earth metal hydroxide or carbonate.

EXAMPLE

A tube of unplasticized regenerated cellulose formed by the complete denitration of cellulose nitrate casing having a dry film thickness of about 3 mils was run through an aqueous 2.0% silver nitrate solution for a dwell time per unit length of one minute. From the silver nitrate bath the tube proceeded through an aqueous bath of 3.0% potassium hydroxide for a dwell time per unit length of seven minutes. The tube was then run through a water wash bath and then through an aqueous neutralizing bath of 0.5% phosphoric acid. The tube was exposed to artificially produced actinic rays and daylight during and after its run through the alkaline bath. Each of the baths were at room temperature.

The silverized tubing was dried to give the maximum relaxation possible in the machine direction so as to reduce the ultimate machine direction shrinkage under battery conditions.

After drying the tubing was cut to the desired form for use as a semi-permeable battery separator.

The electro-chemical generator of this invention preferably includes an alkaline electrolyte solution, for example, a solution of alkali metal hydroxide. The positive electrode of the battery is preferably either a silver or nickel containing material while the negative electrode preferably contains either zinc or cadmium. A specific embodiment of the invention is seen in the accompanying drawing in which 2 is the battery casing. 4, 4' and 4" are permeable nylon separators. In general, any oxidation-resistant cellulosic or synthetic resin fabric or mesh is useful for the permeable separator. 6 and 6' are negative electrodes of zinc oxide, and 8 is a positive electrode of metallic silver. 10 represents one or more layers of semi-permeable membrane separating the electrodes while permitting electrolyte ions to migrate freely. The semi-permeable membrane 10 is a non-fibrous regenerated cellulose film having colloidal silver uniformly dispersed therein. 12 is the alkaline electrolyte medium which, in this embodiment, is an aqueous solution of about 45% potassium hydroxide.

The oxidation resistance of the colloidal metal-impregnated cellulose films of this invention under strong alkali conditions was determined using a test which is accepted in some commercial battery laboratories as correlating to film life in a battery. The test consists of attaching a standard metal weight to a test film strip of fixed dimensions and suspending it in a flask containing 45% potassium hydroxide so that one half of the film remains above the liquid level, while the remaining portion including the weight is submerged in the caustic solution. The flask is then placed in an oven maintained at 57° C. and the length of time required for the breaking of the film to occur is noted. The results of this test are set forth in the following table.

Table

| Film | Dry thickness, mils | Hours before break, avg. |
|---|---|---|
| Regenerated viscose | 0.9 | 19 |
| Denitrated cellulose nitrate | 1.2 | 50 |
| Regenerated viscose plus 1.43% colloidal silver | 0.9 | 134 |
| Denitrated cellulose nitrate plus 1.80% colloidal silver | 1.2 | 1,662 |

Various changes and modifications may be made practicing the invention without departing from the spirit and scope thereof and, therefore, the invention is not to be limited except as defined in the appended claims.

We claim:

1. A method of preparing a semi-permeable battery separator which comprises immersing a film of regenerated cellulose in a dilute aqueous solution of a water-soluble salt of a metal selected from the group consisting of silver and gold for at least about 0.1 minute, then immersing said film in a dilute aqueous alkaline bath and exposing it to actinic rays for a sufficient length of time to deposit at least about 0.5% based on the weight of the film, of the metal of said water-soluble salt in colloidal form within the pores of said film, and washing and drying the film.

2. The method of claim 1 wherein the regenerated cellulose is denitrated cellulose nitrate.

3. The method of claim 1 wherein the water-soluble salt is silver nitrate and said alkaline bath contains potassium hydroxide.

4. The mehod of claim 3 wherein the solution of silver ntrate has a concentration of 2% and the potassium hydroxide is present in the alkaline bath at a concentration of about 3%.

5. The method of claim 4 wherein the film is immersed in the alkaline bath for between 5 and 10 minutes.

6. A method of preparing a semi-permeable battery separator which comprises immersing a denitrated cellulose nitrate film in an aqueous solution of silver nitrate at a concentration of about 2% for about 1 minute, immersing said film in an aqueous solution of potassium hydroxide at a concentration of about 3% for about 5 to 10 minutes, exposing said film to actinic rays, neutralizing said film in an aqueous bath of about 0.5% phosphoric acid, and then washing and drying the film.

References Cited by the Examiner

UNITED STATES PATENTS

| 1,738,044 | 12/1929 | Giovanni | 117—227 |
| 2,297,691 | 10/1942 | Carlson | 96—1 |
| 3,013,099 | 12/1961 | Mendelsohn | 136—146 |
| 3,091,554 | 5/1963 | Rosser et al. | 136—146 X |

WINSTON A. DOUGLAS, *Primary Examiner.*

D. L. WALTON, *Assistant Examiner.*